UNITED STATES PATENT OFFICE 2,290,173

BACTERICIDAL, GERMICIDAL, AND ANTISEPTIC MATERIALS

Albert K. Epstein and Benjamin R. Harris, Chicago, Ill.

No Drawing. Application August 31, 1940, Serial No. 355,032

19 Claims. (Cl. 167—22)

This invention relates to antiseptic, bactericidal and germicidal materials and compositions.

It has been found that certain materials, hereinafter described in detail, possess antiseptic, bactericidal and germicidal properties to a marked degree and are substantially non-toxic toward even highly delicate animal tissues.

At least most of the antiseptic, bactericidal and germicidal materials of the present invention fall within the scope of the general formulae

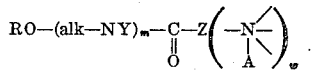

and

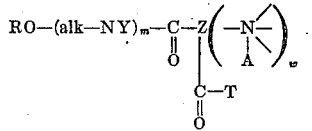

wherein R is an organic radical containing at least four and preferably from six to fourteen carbon atoms, alk stands for hydrocarbon, for example, alkylene or arylene such as ethylene or phenylene, Y is hydrogen, alkyl, cycloalkyl, alkoxyl, aralkyl, aryl, or alkylol, Z is a residue, preferably a carbon-hydrogen residue, of a mono- or poly-carboxylic acid, preferably aliphatic and preferably containing not more than eight carbon atoms, A is an anion, preferably of a solubilizing character and particularly halogen, T is (1) a member of the group NHR' where R' is hydrogen, lower alkyl, hydroxyalkyl, and cycloalkyl, or (2) OY' where Y' is a cation, lower alkyl, cycloalkyl or an aliphatic polyhydric alcohol radical, $m$ and $w$ are whole numbers, $w$ being preferably 1 or 2, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

A more limited and preferred group of the antiseptic, bactericidal and germicidal materials of the present invention may be represented by the general formulae

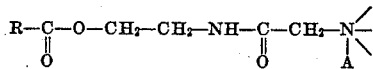

and

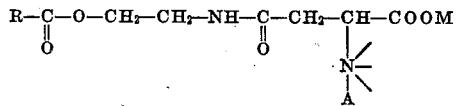

wherein R is a fatty acid hydrocarbon radical containing from five to thirteen carbon atoms, M is a cation, A is halogen, and the three valence bonds attached to nitrogen are linked directly to carbon.

The radical R in the above formulae may be of aliphatic, cycloaliphatic, aromatic or aromaticaliphatic character, and may contain substituent groups such as amino, hydroxy, halogen, sulphate, sulphonic, phosphate, carboxyl, nitrile, and the like, as will be pointed out hereinafter, but it is particularly preferred that it be unsubstituted aliphatic or fatty and contain upwards of five carbon atoms. Z and alk may likewise contain substituent groups such as those just mentioned and the sequence of carbon atoms therein may be interrupted by O, S, C=O, NH, NR where R is alkyl, and the like.

In order that the nature of the invention may become apparent, there are listed hereinbelow various examples of the antiseptic, bactericidal, and germicidal materials which fall within the scope of the invention:

(1) $C_{11}H_{23}-\underset{\underset{O}{\|}}{C}-O-CH_2-CH_2-NH-CO-CH_2-N\underset{Cl}{\diagdown}\hspace{-0.5em}\diagup$ (2) $C_{17}H_{35}-\underset{\underset{O}{\|}}{C}-O-CH_2-CH_2-NH-CO-CH_2-N\underset{Br}{\diagdown}\hspace{-0.5em}\diagup$ (3) $C_{13}H_{27}-\underset{\underset{O}{\|}}{C}-O-CH_2-CH_2-NH-CO-CH_2-N\underset{Cl}{\diagdown}\hspace{-0.5em}\diagup$ (4) $C_{17}H_{35}-\underset{\underset{O}{\|}}{C}-O-C_2H_4-NH-CO-CH_2-CH_2-N\underset{Cl\ C_2H_5}{\overset{C_2H_5}{\diagdown}}$ (5) $C_7H_{15}-\underset{\underset{O}{\|}}{C}-O-CH_2-CH_2-NH-CO-CH_2-N\underset{Cl\ C_2H_5}{\overset{C_2H_4OH}{\diagdown}}$ (6) $C_{17}H_{35}-\underset{\underset{O}{\|}}{C}-O-CH_2-\underset{OH}{\overset{|}{C}H}-CH_2-NH-CO-CH_2-N\underset{Cl}{\diagdown}\hspace{-0.5em}\diagup$ (7) $C_{10}H_{21}-\underset{\underset{O}{\|}}{C}-O-CH_2-CH_2-NH-CO-CH_2-N\underset{Cl\ CH_3}{\overset{CH_3}{\diagdown}}$ (8) $C_{12}H_{25}-O-CH_2-CH_2-NH-CO-CH_2-N\underset{Br}{\diagdown}\hspace{-0.5em}\diagup$ (9) $C_{11}H_{23}-\underset{\underset{O}{\|}}{C}-O-CH_2-CH_2-CH_2-NH-CO-CH_2-N\underset{Cl}{\diagdown}\hspace{-0.5em}\diagup$

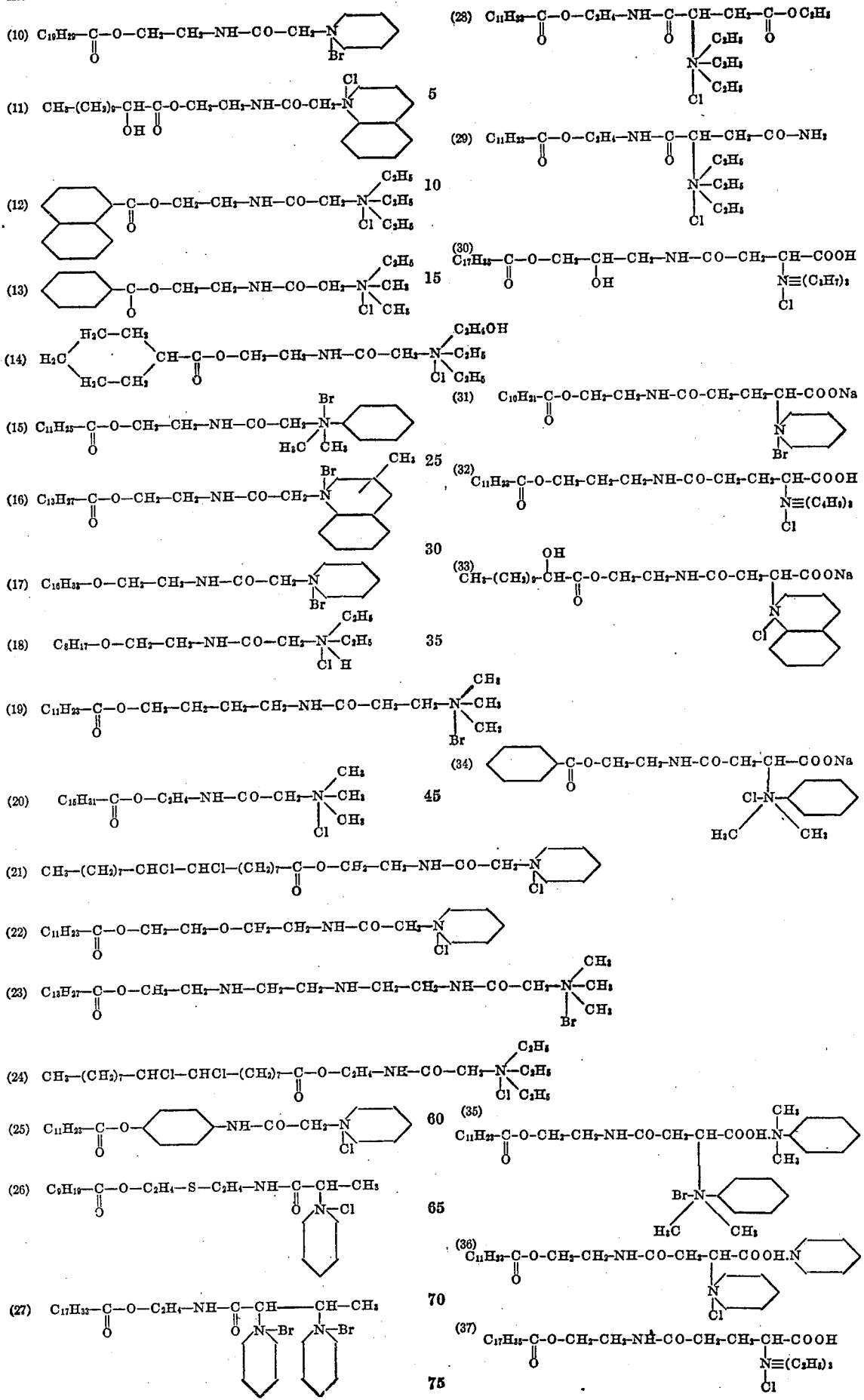

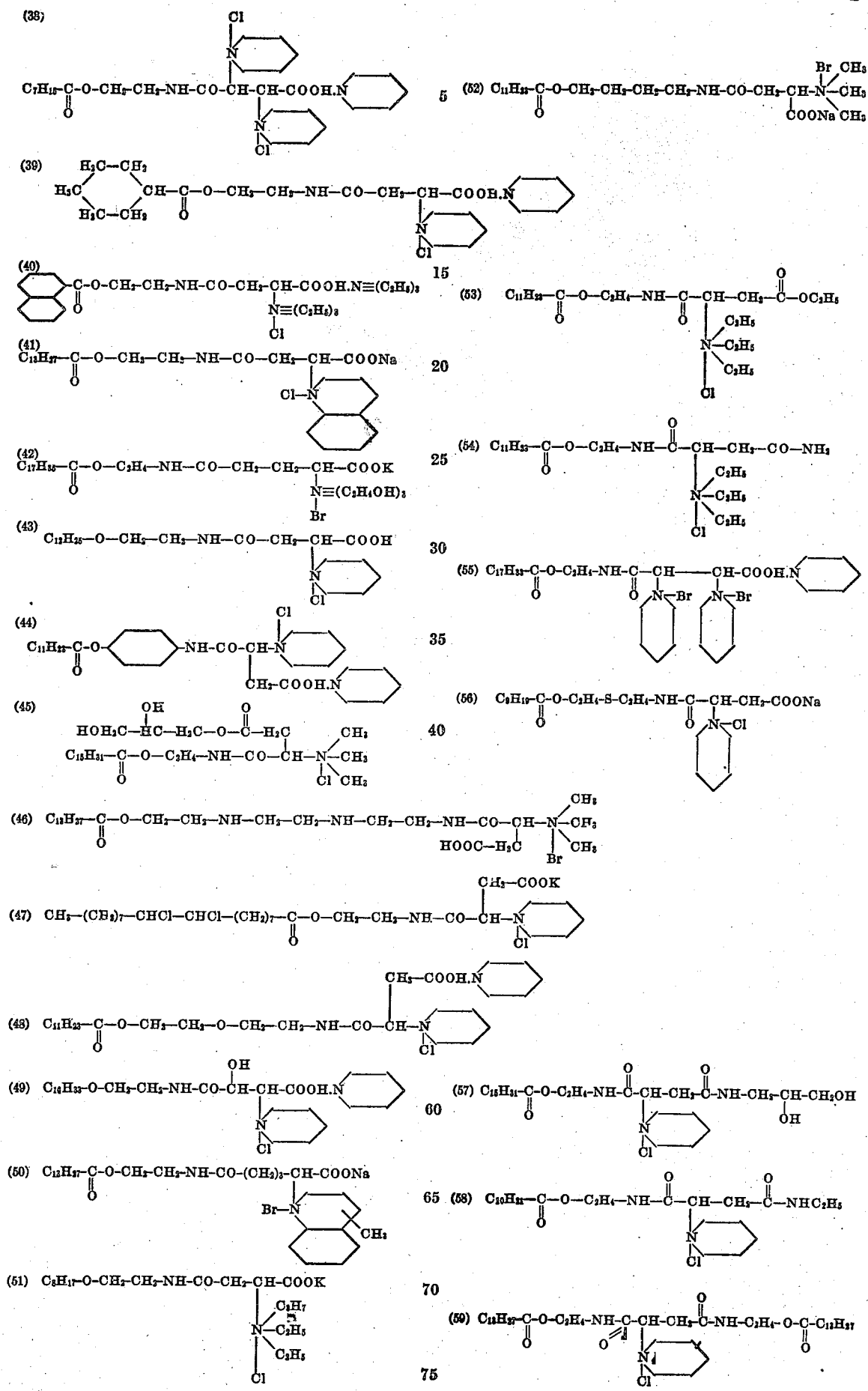

The following methods are illustrative of those which have been found suitable for preparing various of the materials which are disclosed herein:

Example A (1) To 6.1 grams of monoethanolamine dissolved in 50 cc. of water and maintained in an ice bath there were added dropwise, with vigorous stirring, 21.6 grams of alpha-brom propionyl bromide. When approximately half of the latter had been added, the dropwise addition of 46.5 cc. of 2N NaOH was begun, the rest of the alpha-brom propionyl bromide being added dropwise meanwhile. The reaction was completed in 15 minutes and the mass was then evaporated on the water bath. It was then extracted with 500 cc. of boiling isopropyl alcohol and the mineral salts, such as sodium bromide, were filtered off. The alcohol was then evaporated and the reaction product, which was a viscous liquid, consisted essentially of a compound having the formula $$CH_3-CH-CO-NH-CH_2-CH_2OH$$
$$\phantom{CH_3-C}|$$
$$\phantom{CH_3-CH}Br$$

(2) 10 grams of the product, produced as described in part 1 hereof, were dissolved in 15 grams of pyridine, cooled to 5 to 10 degrees C., and there were added dropwise, with vigorous stirring, 8 grams of lauroyl chloride. During the reaction, the temperature rose to 35 degrees C. The reaction mass was then allowed to stand overnight at room temperature. The reaction mass was a medium brown viscous liquid, a substantial proportion of which contained a compound having the formula

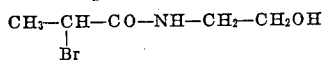

(3) The reaction mass of part 2 was purified by adding thereto excess petroleum ether to extract the unreacted pyridine. The residue was then dried.

Example B (1) 122 grams of ethyl chloracetate were added slowly to a 25% aqueous solution containing 122 grams of monoethanolamine, the reaction being conducted at a temperature of 0 degrees C. to 10 degrees C. At the end of 15 minutes the reaction appeared to be complete. Approximately 126 grams of oxalic acid were then added to neutralize the excess of ethanolamine, maintaining preferably a temperature of 0 degrees C. to 10 degrees C. The water present in the reaction mixture was then evaporated off on the water bath and 1000 grams of iso-propyl alcohol were added. The mass was then filtered, the monoethanolamine oxalate being insoluble, and the alcohol was distilled off from the filtrate on a water bath under vacuum. The resulting product, consisting essentially of N-beta-hydroxyethyl, chloracetamide, was a semi-viscous liquid.

(2) 18 grams of the product prepared as described in part 1 hereof were dissolved in 25 grams of pyridine and cooled to 5 degrees C. 18 grams of caprylyl chloride were then added dropwise with vigorous stirring and the mass was then allowed to stand overnight. The reaction product contained a substantial proportion of a compound having the formula

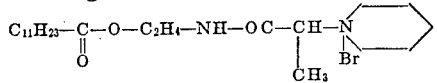

The reaction mass may be purified by extraction with petroleum ether, as described in the previous example.

Example C (1) 10 grams of maleic anhydride were added slowly, with stirring, to a solution of 6.2 grams of monoethanolamine and 25 cc. of dry dioxane. The reaction mixture, after a period of about 10 minutes, was cooled to 25 degrees C. on a cold water bath.

(2) To the reaction product of part 1 hereof, 22 grams of lauroyl chloride were added dropwise, with stirring, over a period of about ½ hour, the reaction mixture being maintained at about 30 degrees C. in a cold water bath.

(3) To the reaction mass produced in part 2 hereof, chlorine gas was slowly bubbled therethrough for a period of about 4 hours or until a total of about 7 grams of chlorine was absorbed. 30 grams of triethyl amine were then added slowly and with stirring, the reaction mass being kept at a temperature of 30 degrees C. to 40 degrees C. in a cold water bath. The mass was then allowed to stand for approximately two days. The reaction mass contained a substantial proportion of a compound having the following probable formula:

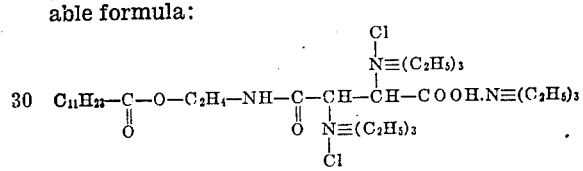

Example D (1) 12.4 grams of monoethanolamine were dissolved in 50 cc. of water and there were added thereto, dropwise and with stirring and cooling in an ice bath, 40 grams of di-brom succinyl bromide. During the addition of the di-brom succinyl bromide, 8 grams of sodium hydroxide, previously dissolved in 50 cc. of water, were gradually added. The additions of the di-brom succinyl bromide and the solution of the sodium hydroxide took place over a period of about ½ hour.

(2) To the reaction mass of part 1 hereof, 42 grams of lauroyl chloride were slowly added, and simultaneously therewith a solution of 8 grams of sodium hydroxide and 50 cc. of water was slowly added, the reaction mass being maintained in an ice bath during the addition. The oily reaction product was taken up with 100 cc. of ethyl ether and anhydrous sodium sulphate was mixed therewith in order to dry the product. The salts were then filtered off and the ether evaporated, the resulting residue being a reddish oil.

(3) To the reaction product of part 2 hereof, maintained at about 25 degrees C., 25 cc. of pyridine were added and the mass was allowed to stand for a period of about 24 hours. The reaction product contained a substantial proportion of the compound having the following probable formula:

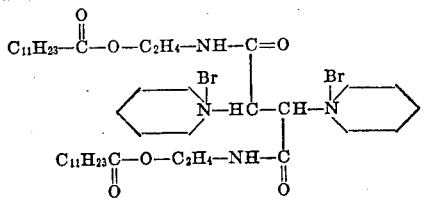

Example E (1) To 71 grams of maleic anhydride, 100 cc.

of dry chloroform and 113.5 grams of bromine were added and the mixture exposed to sunlight for a period of 5 to 6 hours. From the resulting solution, which was amber colored, the chloroform was evaporated in vacuo at a temperature from 50 degrees C. to 60 degrees C. The residue comprised largely di-brom succinic anhydride.

(2) 3.1 grams of monoethanolamine were dissolved in 50 cc. of water and there were added thereto, slowly and with stirring, 13 grams of di-brom succinic anhydride, as produced in part 1 hereof. The addition of the di-brom succinic anhydride took place over a period of about 10 minutes, the reaction mass being maintained at a temperature of 25 degrees C. to 30 degrees C. in a cold water bath.

(3) The reaction mass of part 2 hereof was evaporated to dryness and there were added thereto, while maintaining the product at about 25 degrees C., 20 cc. of pyridine and there were then added, dropwise, and with stirring, 10 grams of lauroyl chloride. The reaction mass was allowed to stand for 24 hours. It contained a substantial proportion of a compound having the following probable formula:

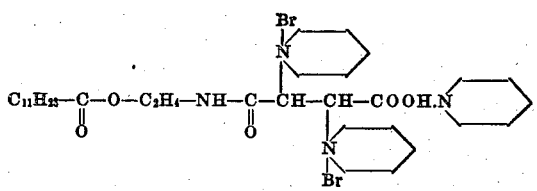

*Example F*

(1) 5.3 grams of diethanolamine were dissolved in 50 cc. of water and there were added thereto, slowly and with stirring, 13 grams of di-brom succinic anhydride, the reaction mass being maintained at a temperature of about 30 degrees C. for about 10 minutes.

(2) The reaction mass of part 1 hereof was heated, in vacuo, to evaporate the water and the liquid residue was then cooled to 25 degrees C. and there were added thereto, slowly and with stirring, 30 cc. of pyridine, the reaction mass being kept at a temperature of about 25 degrees C. 16.2 grams of octoyl chloride were then added dropwise to the reaction mass and the same was then allowed to stand for a period of about 24 hours. 100 cc. of approximately 0.5 N alcoholic KOH were then added. The resulting reaction product was then washed twice, each time with 200 cc. portions of petroleum ether to eliminate the excess pyridine which was soluble therein. After each washing, the petroleum ether was decanted and the petroleum ether adhering to the residue was driven off at slightly elevated temperatures. The final product contained a substantial proportion of a compound having the following probable formula:

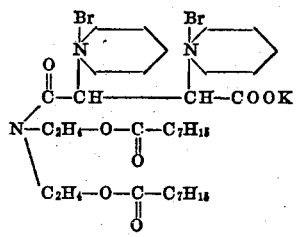

*Example G*

(1) 6.0 grams of monoethanolamine were dissolved in 50 cc. of water and there were added thereto, slowly and with stirring, 18 grams of mono-brom succinic anhydride. During the addition of the mono-brom succinic anhydride, which took place over a period of about 10 minutes, the reaction mass was maintained at a temperature between 25 degrees C. and 30 degrees C. by means of a cold water bath.

(2) The reaction product of part 1 hereof was heated in vacuo to evaporate the water and, to the oily residue, 18 cc. of pyridine were added, the mass being maintained at about 25 degrees C. There were then added, dropwise and with stirring and cooling to about 30 degrees C., 30 grams of stearoyl chloride. The reaction mass was then allowed to stand for about 24 hours and was washed twice, each time with 200 cc. portions of petroleum ether, the remaining procedure being the same as described hereinabove in Example F. The final product contained a substantial proportion of a compound having the following probable formula:

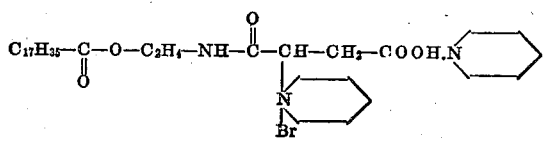

*Example H*

(1) To 217 grams (2 mols) of methyl chloracetate 62 grams (1 mol) of monoethanolamine were added slowly with stirring, the temperature of the mixture being kept at approximately 0 degrees C. The addition of the monoethanolamine was made over a period of about 1¼ hours, a small amount of finely divided solid carbon dioxide being added to the reaction product to help maintain the temperature at about 0 degrees C. The reaction product was then subjected to a vacuum at a temperature of 20 degrees C. to 50 degrees C. and at an absolute pressure of 12 mm. to 70 mm. in order to remove the methyl alcohol which formed during the reaction, the carbon dioxide, and at least most of the excess methyl chlor acetate. Approximately 180 grams of a reaction product were obtained consisting essentially of the chloracetamide of monoethanolamine (HO—C₂H₄—NH—CH₂Cl).

(2) To the reaction product of part 1 hereof, 330 grams of lauroyl chloride (approximately 63% pure, the balance comprising largely lauric acid) were added and the mass was heated, with stirring and under vacuum, for one hour at a temperature ranging from 60 degrees C. to 95 degrees C., in order to remove the hydrochloric acid which formed during the reaction. The reaction mass was then washed four times with tap water at 65 degrees C. until free of hydrochloric acid.

(3) 12 grams of the lauric acid ester of the chloracetamide of monoethanolamine, resulting from part 2 hereof, were added to 16 grams of anhydrous trimethylamine at −5 degrees C. 60 grams of benzene were then added whereby the material was completely dissolved. The solution was allowed to warm up to room temperature in a stoppered flask and, after one-half hour, a substantial quantity of a white, crystalline material had precipitated. The mixture was allowed to stand for several hours at room temperature and the precipitate was collected by rapid filtration, with suction, and placed in a vacuum desiccator over P₂O₅ to dry. It was a white, crystalline material, somewhat hygroscopic, and consisted primarily of a compound having the following formula

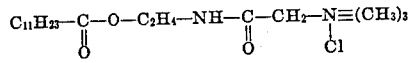

The filtrate from the first crop of crystals was chilled and a second crop of crystals was recovered in the manner described hereinabove. Additional crops of crystals may be recovered by concentration of the filtrates in vacuo, chilling and filtering.

*Example I*

(1) 4 pounds and 3 ounces of the lauric acid ester of the chloracetamide of monoethanolamine, produced as described in parts 1 and 2 of Example H, were further purified by dissolving the same in ether, the small amount of water which separated out was removed, and the ether solution was dried over sodium sulphate. The ether was then evaporated under reduced pressure.

(2) The residue from part 1 hereof was dissolved in about 4 liters of ethyl alcohol at 40 degrees C. The solution was allowed to stand for one-half hour in a cold water bath, at a temperature of about 18 degrees C. to 20 degrees C., and the precipitate which formed was collected and air dried for two hours. The filtrate was then held at 18 degrees C. to 20 degrees C. for one hour and a second crop of crystals was obtained. The two crops of crystals, comprising about 1127 grams, were dissolved in two liters of ethyl alcohol at 40 degrees C. and the resulting solution was cooled to 18 degrees C. The precipitate was collected and spread out on a tray and dried.

(3) 441 grams of the precipitate of part 2 hereof, which comprised the lauric acid ester of the chloracetamide of monoethanolamine (containing about 1.09% fatty acid) were melted on a water bath and 120 grams of pyridine were added. The mixture was heated on the water bath at 90 degrees C. to 95 degrees C. The reaction mass became brown and very viscous and, after 20 minutes, a considerable quantity of crystals appeared. On continuing the heating for an additional 20 minutes, the mass became solid. The heating was then continued for another 30 minutes. The resulting product was then ground with benzene, filtered, washed with ligroin, ground and sieved and then spread out on trays to dry. The yield was 474 grams. The product, which had a slightly pink color, had the formula

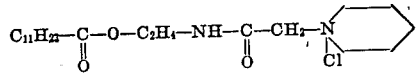

To remove the pinkish color, the product was suspended in ligroin, shaken and filtered, ground, sieved and dried at 100 degrees C. The yield was 472 grams.

It will be understood, particularly in the light of the examples hereinabove, that the materials of the present invention may contain one or more imino or like linkages. Thus, for example, in place of employing monoethanolamine or monopropanolamine or the like as a starting material, materials may be utilized having a plurality of imino groups such as the following, by way of illustration:

(a) $HO-CH_2-CH_2-NH-CH_2-CH_2-NH-CH_2-CH_2-NH_2$ (b) $HO-CH_2-CH_2-CH_2-NH-CH_2-CH_2-CH_2-NH-CH_2-CH_2-CH_2-NH_2$ (c) $HO-\left(\underset{\underset{OH}{|}}{CH_2-CH-CH_2-NH}\right)_x-\underset{\underset{OH}{|}}{CH_2-CH-CH_2-NH_2}$ As Examples 8, 17, 18, 43, 49 and 51 show, the materials may also comprise higher molecular weight ether derivatives. The higher molecular weight ethers may be prepared, for example, by reacting a compound containing a reactive halogen, for example,

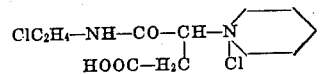

or

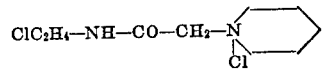

with an alkali metal alcoholate such as sodium laurylate ($C_{12}H_{25}$—ONa) in accordance with general methods known in the art. In general, the higher molecular weight esters are more satisfactory for most purposes.

In certain instances, as indicated, by way of illustration, in Examples 32, 37, 43 and 46, a free carboxyl group may be present in the materials. Such materials may be further reacted to esterify or amidify the free carboxyl group to convert the same into the groups —$CONH_2$, —CONHR, and COOR where R is preferably lower molecular weight alkyl or cycloalkyl such as ethyl, butyl, cyclohexyl, and the like, which may contain substituent groups such as halogeno, hydroxy, amino, cyanogen and the like. In the case of the ester linkage, that is, the —COOR group, the radical R may be that of a polyhydric alcohol or polyhydroxy substance such as glycerol, glycols, and polyglycols such as ethylene glycol, propylene glycol, butylene glycol, di-ethylene glycol, polyglycerols, and the like. The usual amidification and esterification procedures can readily be adapted by the skilled chemist to the preparation of such derivatives.

The higher molecular weight organic radical represented by R in the general formulae may, as stated, be derived from various sources. Among such sources may be mentioned straight chain and branched chain higher molecular weight carboxylic, aliphatic, and fatty acids, saturated and unsaturated, such as caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as i-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

In those cases where ethers are prepared, the higher molecular weight organic radical is derived from alcoholates of alcohols corresponding to the higher molecular weight acids referred to hereinabove.

It has previously been indicated that the anion represented by the letter A in the general formula illustrating most of the materials of the present invention is preferably a solubilizing anion such as chlorine, bromine or iodine. Other anions may be substituted therefor as, for example, OH⁻, HSO₄⁻, RSO₄⁻, C₆H₅SO₃⁻, NO₃⁻, acetate, propionate, caproate, laurate, oleate, stearate, borate, phosphate, or some other organic or inorganic anion. As a general rule the halogen derivatives are particularly satisfactory.

The halogeno-mono-carboxylic acids or other derivatives thereof, preferably in the form of their esters with ethyl alcohol or the like, which are reacted with the primary and secondary alcohol amine may be selected from a relatively large class including, for example, mono-chloracetic acid, chloracetyl chloride, bromacetyl bromide, mono iodoacetic acid, alpha-chlor propionic acid, alpha-chlor butyric acid, alpha-bromo capric acid, and the like. Of particular utility are ethylchloracetate and ethyl bromacetate.

The unsaturated polycarboxylic acids, their anhydrides and esters, and the halogeno-polycarboxylic acids or other derivatives thereof, in the form of their esters with ethyl alcohol or the like, which are reacted with the primary or secondary alcohol amines or the higher esters or ethers of said alcohol amines may be selected from a relatively large class including aliphatic and aromatic compounds such as, for example, maleic acid, maleic anhydride, ethyl maleate, fumaric acid, mono-chlor succinyl chloride, di-chlor succinyl chloride, mono-chlor succinic acid, di-chlor succinic acid, ethyl chlor-succinate, di-chlor glutaryl chloride, and the corresponding derivatives of malonic acid, citraconic acid, mesaconic acid, itaconic acid, mucic acid, adipic acid, pimelic acid, sebacic acid, suberic acid, azelaic acid, aconitic acid, phthalic acid, and the like. Of particular utility, in this group, are maleic acid, fumaric acid, ethyl maleate, and maleic anhydride.

The primary and secondary alcohol amines or alkylolamines which are reacted with the chlor acetyl chloride, chlor succinyl chloride or the like to produce the halogen-containing amides include, among others, by way of example, monoethanolamine, diethanolamine, monopropanolamine, dipropanolamine, monobutanolamine, dibutanolamine, the mono- and di- pentanolamines, hexanolamines, octanolamines, decanolamines, and the like,

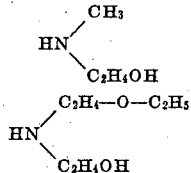

monocyclohexyl, beta - hydroxy - ethyl amine; monobutyl, beta-hydroxyethyl amine; phenyl ethanolamine; N-beta-hydroxy ethyl aniline, 2-methylamino-propan-diol-1,3; 1-phenyl-amino-propan-diol-2,3; 1-hydroxy - ethylamino - 2, methoxy-propan-ol-3; 2-N - methylamino - propan-diol-1,3; monoethanol monopropanolamine, monoethanol monobutanolamine, glycerol monoamines, namely, 1-amino-2,3-propanediol and 2-amino-1,3-propanediol; diglycerolamine; hydroxylamine (H₂N-OH) and derivatives thereof such as result from replacement of one amine hydrogen by an alkyl such as methyl, ethyl, propyl, butyl and the higher homologues; hydroxy amines, particularly secondary hydroxy amines, derived from polyhydric alcohols, including sugars and sugar alcohols such as dextrose, sucrose, sorbitol, mannitol and dulcitol, $$HN\diagup^{C_2H_4OH}_{C_2H_4-NH-C_2H_4OH}$$

$$HN\diagup^{C_2H_4-O-C_2H_4-OH}_{C_2H_4-O-C_2H_4-OH}$$

$$HN\diagup^{C_2H_4-S-C_2H_4-OH}_{C_2H_4-S-C_2H_4-OH}$$

and the like; 2-amino-2-methyl-1,3-propanediol; trimethylol amino methane; 2-amino-2-n-propyl-1,3 - propanediol; 2-amino-2- isopropyl-1,3- propanediol; 2-amino-2-methyl-1,4-butanediol; 2-amino-2- methyl -1,5- pentanediol; 2- amino -2- ethyl-1,3- propanediol; 2-amino -2- ethylol -1,3- propanediol; 2-amino-2-methyl-1, 6-hexanediol; 1-amino-1, 1-dimethyl ethanol; trimethylol amino-methyl methane; trimethylol amino-methylol methane. The glycerol mono-amines and the related hydroxy amines such as various of those disclosed hereinabove may be prepared by various procedures and in different ways. Many of them are conveniently produced by nitrating paraffin hydrocarbons, substituting methylol groups for hydrogen on the carbons to which the nitro groups are attached, and then reducing the nitro groups to amine groups. These amine groups may be further alkylated or otherwise substituted if desired. Polymerized non-tertiary hydroxy amines or polymerized hydroxy amines containing hydrogen directly attached to nitrogen and prepared, for example, by polymerizing monoethanolamine or diethanolamine or mixtures thereof, or other hydroxy amines such as those mentioned hereinabove, particularly in the presence of a catalyst such as sodium hydroxide or the like, may also be employed. The preparation of polymerized hydroxy amines is disclosed, for example, in United States Patent No. 2,178,173; and homologues and substitution derivatives of the above-mentioned hydroxy amines. It will be understood that the hydroxy amines may be utilized in pure or commercial form.

The pentavalent nitrogen present in the substances of the present invention may be introduced into the molecule by means of various organic nitrogenous bases as, for example, alcohol amines and alkylol-, arylol- and aralkylol amines including mono-, di- and tri- ethanolamine and mixtures thereof such as are, for example, present in so-called commercial triethanolamine, propanolamines, butanolamines, pentanolamines, hexanolamines, glycerolamines, dibutyl ethanolamine, diethanol ethyl amine, cyclohexyl ethanolamine, diethanol cyclohexylamine, ethanol aniline, alkylol polyamines such as alkylol derivatives of ethylene diamine, mono-methyl monoethanolamine, diethyl-mono-ethanolamine, 1-amino-2, 3 propanediol; 1,2-diaminopropanol; alkylamines such as trimethyl amine, triethyl amine, tripropyl amine, and other tertiary amines; butyl amine, hexylamine, dimethylamine, ethylene diamine, diethylene triamine, triethylene tetra-amine, mono-methyl ethylene diamine, mono-ethyl diethylene tetra-amine, monoallyl amine, aromatic and heterocyclic bases such as benzylamine, cyclo-hexylethyl-aniline, morpholine, pyridine, alkyl pyridines such as methyl-pyridine, piperidine, pyrrolidines, quinoline, quinaldine, nicotine, and homologues and derivatives or substitution products thereof; mixtures of any two or more thereof, and the like. It will be understood that these organic bases may be employed in pure or commercial form.

As indicative of the unusual bactericidal and germicidal effects produced with the materials of the present invention, reference may be had, for example, to certain tests carried out with a representative material, specifically, having the following formula

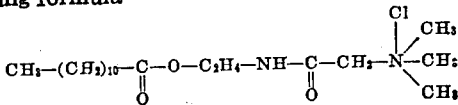

Concentrations of 0.03% gave 90% to 100% inhibition of bacterial metabolism with suspensions containing approximately five billion cells per cc., in the usual buffer solutions, tested in the Warburg apparatus, of the following micro-organisms:

Staphylococcus aureus_____ (Gram positive)
Staphylococcus albus_____ (Gram positive)
Sarcina lutea_____ (Gram positive)
Micrococcus tetragenus_____ (Gram positive)
Bacilli coli_____ (Gram negative)
Aerobacter aerogenes_____ (Gram negative)
Ps. pyocyaneus_____ (Gram negative)
Proteus vulgaris_____ (Gram negative)

At lower concentrations, of the order of 0.003%, a strong inhibitory effect was observed on some but not on all of the bacteria.

In the F. D. A. method for determination of phenol coefficients, employing *Staphylococcus aureus* at 37 degrees C., at 5 to 10 minute intervals, the following concentrations of the compound set forth hereinabove were employed: 1/100; 1/500; 1/1000; 1/2500; 1/5000; 1/10,000; and 1/15,000. The phenol was employed in concentrations of 1/60; 1/70; 1/80; and 1/90. In the following concentrations, growth was observed in 5 minutes but none in 10 minutes:

Compound set forth herein-
  above_____Between 1/2500 and 1/5000
Phenol _____ 1/65

The phenol coefficient of the compound under discussion was between 38 and 77.

In toxicity tests, by intraperitoneal injections using white mice weighing approximately 20 grams, the animals survived the injection of 150 mg. of the compound under discussion per kilogram of body weight. Toxicity tests on the tissues of the rabbit eye showed that one to three drops of a 0.1% physiological saline solution of the compound under discussion, applied twice each day for a period of four days, produced no reaction. On prolonged irrigation, continuously for five minutes twice each day, in a 0.1% concentration, slight immediate reddening of the eye occurred, clearing up completely by the following morning. After four days of such treatment, there was no evidence of inflammation or damage in the eye. In further tests, the eye was irrigated continuously for five minutes once each day with a 0.5% solution of the compound under discussion. This treatment caused an immediate reddening and some edema of the conjunctival membranes, but the reaction cleared up completely in 24 hours. A continuation of the treatment for five days did not cause permanent reactions.

Tests conducted on mice infected with virulent cultures of pneumococcus, by injecting various dilutions of the virulent organisms intraperitoneally simultaneously with the compound under discussion, showed a definite measure of protection against as high as 100,000 times the lethal dose of pneumococcus.

The effect of the compound of Example 1 on bacterial metabolism is shown by the following table which represents the degree of inhibition of bacterial metabolism produced at a concentration of one part in three thousand.

| Organism: | Compound of Example 1 |
|---|---|
| Staph. aureus | −84 |
| Sarcina lutea | −94 |
| B. coli | −88 |
| Proteus vulgaris | −92 |
| Paratyphi | −69 |

A 1:1000 aqueous solution of the compound of Example 1 was tolerated very well when applied to the rabbit eye. Instillation of several drops of such a solution was harmless. Such solutions, when used to irrigate the eye for several minutes once or twice a day, did not set up harmful reactions in the eye. Stronger solutions, even of the order of 1:500, were tolerated rather well. When such a solution was used to irrigate the eye continuously for three minutes twice each day, it caused a mild reaction in the conjunctiva and cornea, the reaction completely disappearing, however, within fifteen hours after the irrigation.

In toxicity tests made by intraperitoneal injection in mice, 50 milligrams of compound 1, per kilogram of body weight, was given daily for seven days. The animals survived but showed loss of weight and had diarrhea. In dosages of 100 milligrams per kilogram of body weight, in half the cases the mice died in one or two days.

It will be appreciated that the numerous compounds disclosed herein will vary somewhat in bactericidal, germicidal, and antiseptic power or potency and that the effects will also vary depending upon the particular micro-organisms or bacteria or the like or the environment in which the compounds are used. The compounds are employed particularly in dilute aqueous or modified aqueous solutions, usually on the order of 0.1% to several thousandths of one percent. They may be used as such or in conjunction with other agents having bactericidal, germicidal, or antiseptic action.

Wherever the term "higher" is employed as referring to higher molecular weight organic acids or the like, it will be understood to cover compounds or radicals having at least six carbon atoms unless otherwise specifically stated.

What we claim as new and desire to protect by Letters Patent of the United States is:

1. Bactericidal, germicidal and antiseptic agents corresponding to the general formula

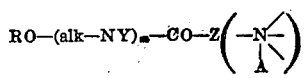

wherein R is an organic radical containing at least four carbon atoms, alk is a hydrocarbon residue with or without interruptions or substitutions, Y is a member selected from the group consisting of hydrogen, alkyl, cycloalkyl, alkoxyl, aralkyl, aryl, and alkylol, Z is a hydrocarbon residue with or without interruptions or substitutions, A is an anion, $m$ and $w$ are small whole numbers, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

2. Bactericidal, germicidal and antiseptic agents corresponding to the general formula

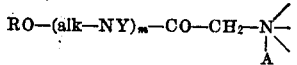

wherein R is an aliphatic radical containing from eight to eighteen carbon atoms, alk is a hydrocarbon residue with or without interruptions or substitutions, Y is a member selected from the group consisting of hydrogen, alkyl, cycloalkyl, alkoxyl, aralkyl, aryl, and alkylol, A is a halogen, $m$ is a small whole number, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

3. Bactericidal, germicidal and antiseptic agents corresponding to the general formula

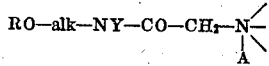

wherein R is an aliphatic radical containing from eight to eighteen carbon atoms, Y is a member selected from the group consisting of hydrogen, alkyl, cycloalkyl, alkoxyl, aralkyl, aryl, and alkylol, A is halogen, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

4. Bactericidal, germicidal and antiseptic compositions comprising a dilute aqueous solution of a substance corresponding to the general formula

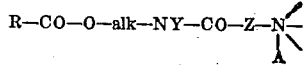

wherein R—CO is an acyl radical containing at least four carbon atoms, alk is alkylene, Y is a member selected from the group consisting of hydrogen, alkyl, cycloalkyl, alkoxyl, aralkyl, aryl, and alkylol, Z is a hydrocarbon residue, A is an anion, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

5. Bactericidal, germicidal and antiseptic agents corresponding to the general formula

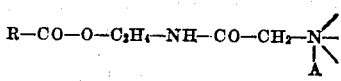

wherein R—CO is an acyl radical containing from eight to eighteen carbon atoms, A is halogen, and the three indicated valence bonds attached to nitrogen are satisfied by lower molecular weight alkyl groups.

6. A bactericidal, germicidal and antiseptic agent corresponding to the formula

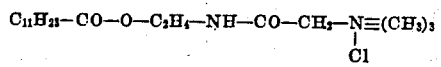

7. Bactericidal, germicidal and antiseptic compositions comprising a dilute aqueous solution of a substance corresponding to the general formula

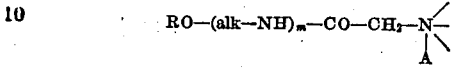

wherein R is a radical selected from the group consisting of alkyl and acyl radicals containing from eight to eighteen carbon atoms, alk is alkylene, $m$ is a whole number, A is a halogen, and the three indicated valence bonds attached to nitrogen are satisfied by lower molecular weight alkyl groups.

8. Bactericidal, germicidal and antiseptic agents corresponding to the general formula

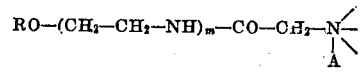

wherein R is a radical selected from the group consisting of acyl and alkyl radicals containing at least six carbon atoms, $m$ is a whole number, A is an anion, and the three indicated valence bonds attached to nitrogen are satisfied by methyl groups.

9. Bactericidal, germicidal and antiseptic compositions comprising a dilute aqueous solution of a substance corresponding to the general formula

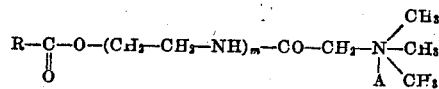

where R—C=O is an acyl radical containing from eight to eighteen carbon atoms, $m$ is a whole number, and A is chlorine.

10. Bactericidal, germicidal and antiseptic agents corresponding to the general formula

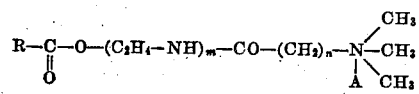

wherein R—C=O is a fatty acid acyl radical containing from eight to eighteen carbon atoms, $m$ and $n$ are small whole numbers, and A is chlorine.

11. Bactericidal, germicidal and antiseptic compositions comprising a dilute aqueous solution of a substance corresponding to the general formula

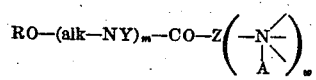

wherein R is an organic radical containing at least four carbon atoms, alk is a hydrocarbon residue with or without interruptions of substitutions, Y is a member selected from the group consisting of hydrogen, alkyl, cycloalkyl, alkoxyl, aralkyl, aryl and alkylol, Z is a hydrocarbon residue with or without interruptions or substitutions, A is an anion, and $m$ and $w$ are small whole numbers.

12. Bactericidal, germicidal and antiseptic agents corresponding to the general formula

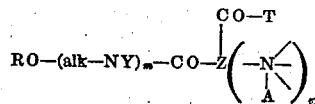

wherein R is an organic radical containing at least four carbon atoms, alk is a hydrocarbon residue with or without interruptions or substitutions, Y is a member selected from the group consisting of hydrogen, alkyl, cycloalkyl, alkylol, alkoxyl, aralkyl, and aryl, Z is the residue of a polycarboxylic acid, A is an anion, T is (1) a member of the group NHR' where R' is hydrogen, lower alkyl, hydroxy-alkyl, cycloalkyl, or (2) OY' where Y' is a cation, lower alkyl, cycloalkyl or an aliphatic polyhydric alcohol radical, $m$ and $w$ are small whole numbers, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

13. Bactericidal, germicidal and antiseptic agents corresponding to the general formula

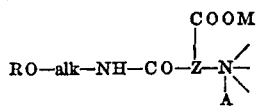

wherein R is an organic radical containing at least four carbon atoms, alk is alkylene, Y is a member selected from the group consisting of hydrogen, alkyl, cycloalkyl, alkoxyl, aralkyl, aryl, and alkylol, Z is the residue of a polycarboxylic acid, A is an anion, M is a cation, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

14. Bactericidal, germicidal and antiseptic compositions comprising a dilute aqueous solution of a substance corresponding to the general formula

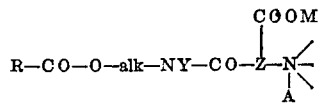

wherein R—CO is an acyl radical containing at least eight carbon atoms, alk is alkylene, Y is a member selected from the group consisting of hydrogen, alkyl, cycloalkyl, alkoxyl, aralkyl, aryl, and alkylol, Z is the residue of an aliphatic dicarboxylic acid, A is an anion, M is a cation, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

15. Bactericidal, germicidal and antiseptic compositions comprising a dilute aqueous solution of a substance corresponding to the general formula

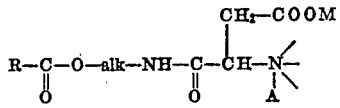

wherein R—C=O is a acyl radical containing from eight to eighteen carbon atoms, alk is alkylene, A is halogen, M is a cation, and the three valence bonds attached to nitrogen are satisfied by lower molecular weight alkyl groups.

16. Bactericidal, germicidal and antiseptic agents corresponding to the general formula

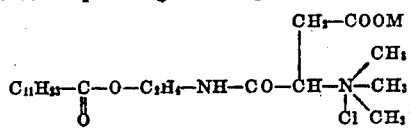

where M is a cation.

17. Bactericidal, germicidal and antiseptic compositions comprising a dilute aqueous solution of a substance corresponding to the general formula

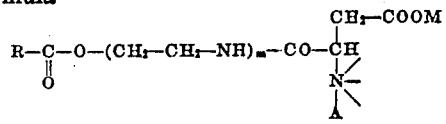

wherein R—C=O is a fatty acid acyl radical containing from eight to eighteen carbon atoms, $m$ is a whole number, A is halogen, M is a cation, and the three valence bonds attached to nitrogen are satisfied by lower molecular weight alkyl groups.

18. Bactericidal, germicidal and antiseptic agents corresponding to the formula

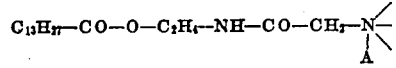

wherein A is halogen, and the three indicated valence bonds are satisfied by the radical of a heterocyclic ring of which the nitrogen is a member.

19. Bactericidal, germicidal and antiseptic agents corresponding to the formula

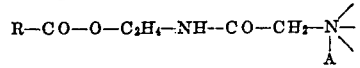

wherein R—CO is the acyl radical of an unsaturated fatty acid containing 18 carbon atoms, A is halogen, and the three indicated valence bonds are satisfied by the radical of a heterocyclic ring of which the nitrogen is a member.

ALBERT K. EPSTEIN.
BENJAMIN R. HARRIS.